(12) United States Patent
Gölzhäuser et al.

(10) Patent No.: US 9,186,630 B2
(45) Date of Patent: Nov. 17, 2015

(54) PERFORATED MEMBRANES

(75) Inventors: Armin Gölzhäuser, Bielefeld (DE); Klaus Edinger, Heppenheim (DE)

(73) Assignee: Universität Bielefeld, Bielefeld (DE)

( * ) Notice: Subject to any disclaimer, the term of this patent is extended or adjusted under 35 U.S.C. 154(b) by 982 days.

(21) Appl. No.: 13/383,460

(22) PCT Filed: Jul. 22, 2010

(86) PCT No.: PCT/EP2010/004504
§ 371 (c)(1),
(2), (4) Date: Jan. 11, 2012

(87) PCT Pub. No.: WO2011/009621
PCT Pub. Date: Jan. 27, 2011

(65) Prior Publication Data
US 2012/0138535 A1    Jun. 7, 2012

(30) Foreign Application Priority Data

Jul. 24, 2009   (DE) .................. 10 2009 034 575

(51) Int. Cl.
| | |
|---|---|
| B01D 61/00 | (2006.01) |
| C02F 1/44 | (2006.01) |
| B01D 39/14 | (2006.01) |
| H05B 6/00 | (2006.01) |
| B01D 67/00 | (2006.01) |
| B01D 69/02 | (2006.01) |
| B01D 69/12 | (2006.01) |
| H01M 8/10 | (2006.01) |

(52) U.S. Cl.
CPC .......... *B01D 67/0006* (2013.01); *B01D 67/003* (2013.01); *B01D 67/0032* (2013.01); *B01D 67/0034* (2013.01); *B01D 67/0093* (2013.01); *B01D 69/02* (2013.01); *B01D 69/125* (2013.01); *B01D 69/127* (2013.01); *H01M 8/1023* (2013.01); *H01M 8/1053* (2013.01); *H01M 8/1072* (2013.01); *H01M 8/1081* (2013.01); *H01M 8/1086* (2013.01); *B01D 2323/30* (2013.01); *B01D 2323/34* (2013.01); *B01D 2323/345* (2013.01); *B01D 2325/028* (2013.01); *B01D 2325/04* (2013.01); *B01D 2325/22* (2013.01); *B01D 2325/24* (2013.01); *B01D 2325/30* (2013.01); *Y02E 60/521* (2013.01); *Y10T 428/24273* (2015.01); *Y10T 428/24322* (2015.01)

(58) Field of Classification Search
CPC ........ B82Y 30/00; B82Y 40/00; B01D 69/00; B01D 69/12; B32B 3/10; G03F 7/20; B29C 35/08; C02F 1/44
USPC .......... 210/500.25, 500.27; 977/755; 428/195.1, 336; 264/488; 427/506, 427/520, 512
See application file for complete search history.

(56) References Cited

U.S. PATENT DOCUMENTS

| | | | | |
|---|---|---|---|---|
| 3,900,540 | A * | 8/1975 | Robba et al. | 264/29.6 |
| 4,761,308 | A * | 8/1988 | Gebhardt et al. | 427/249.3 |
| 5,688,642 | A * | 11/1997 | Chrisey et al. | 435/6.11 |
| 6,764,758 | B1 * | 7/2004 | Grunze et al. | 428/336 |
| 8,377,243 | B2 * | 2/2013 | Golzhauser et al. | 156/230 |
| 8,674,239 | B2 * | 3/2014 | Pretzlaff et al. | 174/650 |
| 8,911,852 | B2 * | 12/2014 | Golzhauser et al. | 428/195.1 |
| 2002/0127491 | A1 * | 9/2002 | Weiss et al. | 430/296 |
| 2003/0219597 | A1 * | 11/2003 | Carr et al. | 428/391 |
| 2004/0076757 | A1 * | 4/2004 | Jacobson et al. | 427/402 |
| 2010/0143726 | A1 * | 6/2010 | Golzhauser et al. | 428/446 |
| 2010/0209330 | A1 * | 8/2010 | Golzhauser et al. | 423/448 |
| 2011/0229699 | A1 * | 9/2011 | Golzhauser et al. | 428/195.1 |
| 2012/0138535 | A1 * | 6/2012 | Golzhauser et al. | 210/650 |

FOREIGN PATENT DOCUMENTS

| | | | |
|---|---|---|---|
| DE | 100 58 258 | A1 | 8/2002 |
| DE | 102007041820 | * | 5/2009 |
| DE | 102008046707 | A1 * | 3/2010 |

OTHER PUBLICATIONS

Eck, Wolfgang, et al., "Freestanding Nanosheets from Crosslinked Biphenyl Self-Assembled Monolayers," Advanced Materials, 2005, vol. 17, pp. 2583-2587.
Schnietz, Mark, et al., "Chemically Functionalized Carbon Nanosieves with 1-nm Thickness," InterScience, Small, 2009, vol. 5, No. 23, pp. 2651-2655.
Turchanin, Andrey, et al., "Fabrication of Molecular Nanotemplates in Self-Assembled Monolayers by Extreme-Ultravioloet-Induced Chemical Lithography," InterScience, Small, 2007, vol. 3, No. 12, pp. 2114-2119.
Zimnitsky, Dmitry, et al., Perforated, Freely Suspended Layer-by-Layer Nanoscale Membranes, Langmuir, 2008, vol. 24, pp. 5996-6006.

\* cited by examiner

*Primary Examiner* — Ana Fortuna
(74) *Attorney, Agent, or Firm* — McDonnell Boehnen Hulbert & Berghoff LLP

(57) ABSTRACT

The present invention relates to a membrane comprising at least one molecular monolayer composed of low-molecular aromatics and cross-linked in the lateral direction, wherein the membrane has a thickness in the range from 1 to 200 nm and a perforation in the form of openings having a diameter in the range from 0.1 nm to 1 μm, to a method for the production thereof, and to a use thereof.

24 Claims, No Drawings

PERFORATED MEMBRANES

CROSS REFERENCE TO RELATED APPLICATIONS

The present application is a 35 U.S.C. 371 National Application of PCT/EP2010/004504, filed Jul. 22, 2010, which claims priority to German Patent Application No. 10 2009 034 575.2, filed Jul. 24, 2009.

The present invention relates to a membrane comprising at least one molecular monolayer composed of low-molecular aromatics and cross-linked in the lateral direction, wherein the membrane has a thickness in the range from 1 to 200 nm and a perforation in the form of openings having a diameter in the range from 0.1 nm to 1 µm, to a method for the production thereof, and to a use thereof.

For the purposes of the present invention, membranes are understood to be semipermeable surface structures. Such membranes have pores and openings, respectively, that extend from one main surface to another main surface of the membrane. Conventional membranes are composed of polymers, such as polyether sulphones, cellulose acetates, polyvinylidene fluorides, polypropenes, polyethenes, polytetrafluoroethenes, and polyamides, and usually have a thickness in the range from 5 to 500 µm.

Generally, semipermeable membranes are used as membrane filters or as adsorption membranes. A membrane filter is a membrane in which the substance separation is determined by the pore size. Here, only molecules having a diameter smaller than the diameter of the pores of the membrane can pass the membrane. In contrast, in adsorption membranes, specific substances are separated by being bonded to suitable ligands of the membrane, while a medium containing these substances flows through the membrane. In addition, semipermeable membranes are known in which by, chemical functionalization, only specific substances pass and diffuse, respectively, through the pores (by analogy with cell membranes).

For the practical uses of these membranes it is desirable for the membrane material to be mechanically stable and thermally and chemically resistant. Moreover, attempts have been made to produce ever thinner membranes and to employ them in various technical fields. However, the reduction of the thickness of membranes is generally accompanied by a deterioration of the mechanical stability. Molecular monolayers having a thickness in the range of a few nanometers have been described. However, these are not suitable as membrane filters or adsorption membranes.

It is therefore an object of the present invention to provide a membrane which has a thickness in the nanometer range and thus is thinner than conventional membranes, which has extreme mechanical stability and is thermally and chemically resistant, and which is suitable as a membrane filter and/or an adsorption membrane for separating substances.

This object is solved by the embodiments characterized in the claims.

Specifically, a membrane is provided which comprises at least one molecular monolayer composed of low-molecular aromatics and cross-linked in the lateral direction, wherein the membrane has a thickness in the range from 1 to 200 nm and a perforation in the form of openings having a diameter in the range from 0.1 nm to 1 µm.

For the purposes of the present invention, a "molecular monolayer" is understood to be a layer that only has the thickness of a molecule. According to the invention, this monolayer is composed of low-molecular aromatics. Depending on the aromatic used, the molecular monolayer can have any suitable thickness. Preferably, such a molecular monolayer has a layer thickness in the range from 0.1 nm to 10 nm, particularly preferably in the range from 0.3 nm to 3 nm, even more preferably in the range from 1 to 2 nm.

The membrane according to the invention has a thickness in the range from 1 to 200 nm. If the thickness is less than 1 nm, the membrane is difficult to handle and not sufficiently tearproof. However, if the thickness is greater than 200 nm, the production process becomes too complex and sufficient permeability is not ensured any more. In a preferred embodiment, the membrane according to the invention has a thickness in the range from 1 to 50 nm, more preferably a thickness in the range from 1 to 20 nm. Particularly preferably, the membrane according to the invention has a thickness in the range from 1 to 2 nm. Since the membrane according to the invention has a thickness in the nanometer range, it will be referred to as a nanomembrane in the following. The thickness of the monolayer or membrane according to the invention can be determined by methods known to the skilled person, such as by atomic force microscopy (AFM).

To obtain a thickness of the membrane in the range from 1 to 200 nm, it may be required to arrange two or more molecular monolayers one on top of the other in the form of a stack. In a preferred embodiment, the membrane according to the invention is therefore composed of a stack of at least two molecular monolayers arranged one on top of the other. Preferably, 2 to 100 monolayers are arranged one on top of the other, particularly preferably 2 to 50, even more preferably 2 to 10 monolayers are arranged one on top of the other.

For the purposes of the present invention, the term "low-molecular aromatics" means such aromatic compounds that are not in an oligomer or polymer form. Moreover, this term includes the possibility that the aromatics are cross-linked with each other after a high-energy radiation treatment. For the purposes of the present invention, the term "aromatics" includes the term "heteroaromatics", i.e. the term "aromatics" means aromatic compounds that do not contain a heteroatom or one or more heteroatoms in at least one aromatic ring. Preferably, the monolayer is composed of aromatics selected from the group consisting of phenyl, biphenyl, terphenyl, naphthaline, anthracene, bipyridine, terpyridine, thiophene, bithienyl, terthienyl, pyrrole, and combinations thereof. In a particularly preferred embodiment of the present invention, the monolayer is composed of biphenyl. This is of particular advantage with respect to the cross-linkability in the lateral direction. Further, monolayers composed of biphenyl have an extreme mechanical stability. However, it is also possible for the monolayer to contain at least two different aromatics. For example, one area of the monolayer can be composed of biphenyl, while another area of the monolayer is composed of bipyridine.

The monolayer according to the present invention is cross-linked in the lateral direction. By cross-linking in the lateral direction, high mechanical and chemical stability is imparted to the monolayer that is composed of the low-molecular aromatics. Preferably, the monolayer is cross-linked by a treatment with electron radiation, plasma radiation, X-ray radiation, β-radiation, γ-radiation, UV radiation or EUV radiation ("extreme UV", with a spectral range between approximately 1 nm and approximately 50 nm).

The membrane according to the invention has a perforation. For the purposes of the present invention, a perforation is understood to be such that the membrane has openings and pores, respectively, which extend from one main surface to another main surface of the membrane. These openings have a diameter in the range from 0.1 nm to 1 µm. In a preferred embodiment of the present invention, the openings have a diameter in the range from 0.1 nm to 100 nm. In another preferred embodiment the openings have a diameter in the range from 100 nm to 1 µm. Depending on the size of the molecules to be separated and the type of separation, a suitable pore size and size of the openings, respectively, can be selected. The pore size can be measured by suitable imaging techniques, such as transmission electron microscopy (TEM) or scanning electron microscopy (SEM). The radius of circular pores can be determined just as the shape and surface area of the openings for non-circular pores.

Moreover, the term "perforation" includes both a non-directed perforation and a directed perforation. A non-directed perforation is understood to be a formation of pores which arises in the course of the production of the membrane and for which no special measures have to be taken. Thus, in a conventional method for producing a membrane, a certain number of pores can possibly be formed, which leads to a non-directed perforation to some extent. According to the invention, a directed, respectively targeted perforation is understood to be a perforation for which target-oriented action is required to form the pores in the membrane. This can be achieved by chemical or physical processes, for example.

The membrane can have any suitable number of openings. The larger the number of openings, the greater the permeability of the membrane. In a preferred embodiment, the membrane has at least $10^3$ openings per $mm^2$ of the surface of the membrane as a perforation. If the membrane comprises less than $10^3$ openings, a sufficient through flow is not ensured, which makes a substance separation using the membrane according to the invention difficult. In a particularly preferred embodiment, the membrane has $10^3$ to $10^{12}$ openings per $mm^2$ of the surface of the membrane as a perforation. Further preferably, the membrane has at least $10^8$ openings per $mm^2$ of the surface of the membrane as a perforation. If the membrane according to the invention is composed of more than one molecular monolayer, the openings in the individual monolayers form the openings and pores, respectively, of the entire membrane together.

In a further preferred embodiment of the present invention, the pores, i.e. the openings, account for at least 5% of the surface of the membrane. Particularly preferably, at least 10%, even more preferably at least 20% of the surface of the membrane consist of openings. Preferably, not more than 80% of the surface of the membrane consist of openings. If this value is exceeded, sufficient mechanical stability of the membrane is not ensured any more.

In a further preferred embodiment of the present invention, one of the two surfaces of at least one molecular monolayer is modified by functional groups. Here, the functional groups are each bonded to the aromatics. The functional groups can be any functional groups that are not split off by the irradiation and that are suitable for a further reaction, for example to reversibly or irreversibly bond further molecules to the monolayer. Preferably, the functional groups are selected from amino groups, nitro groups, carboxy groups, cyano groups, thiol groups, hydroxy groups, and combinations thereof. In a particularly preferred embodiment, one of the two surfaces of at least one molecular monolayer is modified by amino groups as functional groups. In a further particularly preferred embodiment, the functional groups are special ligands suitable for bonding specific target molecules. These ligands can be bonded to the molecular monolayer by modification of the above-mentioned amino groups, nitro groups, carboxy groups, cyano groups, thiol groups, or hydroxy groups.

Examples of such ligands are ion exchangers, chelating agents, amino acids, coenzymes, cofactors and their analogues, endocrine and exocrine substances, such as hormones, enzyme substrates, enzyme inhibitors, nucleic acids, such as DNA and RNA, viruses, and polypeptides, such as proteins, in particular antibodies and enzymes.

The surface of the monolayer is modified by functional groups preferably substantially completely, i.e. substantially all aromatics of the monolayer carry a functional group. However, it is also possible that only a part of the surface is modified by functional groups. In this case, the surface can have a pattern of functional groups. For the purposes of the present invention, a pattern of functional groups designates a chemical structuring of the surface, wherein the functional groups constitute this chemical structuring thus forming the desired pattern on the surface of the monolayer. This structuring and pattern, respectively, is obtained by a partial functionalization of the surface with functional groups. In particular, a monolayer having a target-oriented pattern of functional groups can be obtained in this way.

The use of a membrane modified by functional groups is particularly advantageous if the membrane is to be used as an adsorption membrane for separating specific substances. These substances may be, for example, substances that are to be obtained from a medium in an enriched or pure form. This may be recombinant proteins, for example. However, it is also possible that the substances to be absorbed are contaminants to be removed from a medium. This may be viruses, proteins, amino acids, nucleic acids, or endotoxins, for example. Here, the functional group is to be selected such that it is suitable to reversibly or irreversibly bond the substance to be absorbed. If a substance is to be isolated from a medium, it is advantageous that bonding of these substances to the functional group is performed in a reversible manner.

Even if the molecules to be separated are not adsorbed at the functional groups, these functional groups can nevertheless influence the diffusion of these molecules. In this way, the selectivity of the membrane for specific substances can be adjusted as well.

If the membrane according to the invention is composed of more than one monolayer, one or more of the molecular monolayers can be modified by functional groups. In a preferred embodiment, all molecular monolayers in a membrane according to the invention, which is composed of more than one molecular monolayer, are modified by functional groups. This allows a high concentration of functional groups on, respectively in the membrane, which is e.g. advantageous with respect to the absorption capacity in the case of a use as an absorption membrane.

In a further preferred embodiment, the membrane according to the invention can further comprise an additional coating. Here, this coating should not cover the openings completely, so that a permeability of the membrane is still ensured. The coating can be a metal coating, for example. Preferably, the coating is a gold coating. The coating can have any suitable thickness. Preferably though, the coating has a thickness in the range from 1 nm to 10 nm, particularly preferably in the range from 2 nm to 5 nm. Such an additional coating allows e.g. a better imageability of the surface of the membrane in an electron microscope. Moreover, this additional coating can increase the mechanical stability of the membrane.

The membrane according to the invention can be produced by one of the methods described in the following.

In particular, the present invention relates to a method for producing a membrane which comprises at least one molecular monolayer composed of low-molecular aromatics and cross-linked in the lateral direction, wherein the membrane has a thickness in the range from 1 to 200 nm and a perforation in the form of openings with a diameter in the range from 0.1 nm to 1 μm, the method comprising the steps of:

(a) providing a substrate, (b) applying a monolayer of low-molecular aromatics to at least one surface of the substrate by bonding, (c) treating the substrate obtained in step (b) with high-energy radiation such that the monolayer composed of low-molecular aromatics is cross-linked in the lateral direction, and (d) removing the substrate to obtain the membrane, wherein the method further comprises, during or after one of the above-mentioned steps (a) to (d), the step of:

(e) perforating the membrane, which is performed such that openings having a diameter in the range from 0.1 nm to 1 μm are produced.

The above-described method describes a production method for the membrane according to the invention, in which perforating is performed in a directed, respectively targeted way. Therefore, this method comprises the step (e) of perforating the membrane, whereby the pores are formed in a target-oriented manner.

The method according to the invention comprises, during or after one of the above-mentioned steps (a) to (d), the step of (e) perforating the membrane, which is performed such that openings having a diameter in the range from 0.1 nm to 1 μm are produced. Perforating can be performed by any suitable method.

In a preferred embodiment of the present invention, perforating is performed between steps (c) and (d) or after step (d) by irradiation with particle radiation selected from the group consisting of electron radiation and ion radiation. This method will be referred to as a perforation method (1) in the following.

In the perforating method (1), an intact membrane is produced at first, which either is still bonded to the substrate or can be in a free state after the removal of the substrate in step (d). This membrane is then perforated by being irradiated with particle radiation. To this end, it is required that the radiation has a suitable energy and dose to produce openings in the membrane. If the energy and dose are too high, the membrane can tear. If the energy is too low, the exposure time will be too long. Preferably, radiation in a range between 5 V and 50 kV is used, since low radiation doses suffice for the perforation of thin membranes. This can be achieved by means of finely-focused electron radiation or ion radiation, for example. Focusing and scanning of the beam across the regions to be structured can be performed by electron-optical or ion-optical elements, such as in electron beam lithography with scanning electron microscopes or in lithography with focused ion beams (FIB). The production of openings in the nanomembrane can also be performed by means of near probe methods. In such methods, focusing of electrons or ions is ensured by the small size of the electron or ion source (near probe). The near probe is then guided across the regions to be structured at intervals of 0.1 and 1000 nm. The tips of scanning tunneling microscopes (STM), atomic force microscopes (AFM), and atomically defined field emitter tips, which are produced according to the method described e.g. in Müller et al., *Ultramicroscopy* 1993, 50, 57, are particularly suitable as near probes for electrons. The latter ones are particularly suitable as near probes for the perforation at larger intervals (>10 nm) between probe and sample, and can also be used as sources for field ions.

It is also possible to produce the openings by irradiation with particle radiation in connection with a shadow mask such that only spatially defined regions on the membrane are irradiated, whereby the openings are produced at the irradiated points. To this end, an extensively illuminating electron source in conjunction with a shadow mask can be used, for example, so that only the open regions are exposed to the electrons.

In another preferred embodiment of the present invention, perforating takes place in that cross-linking in step (c) is performed in an incomplete way such that a monolayer with cross-linked and uncross-linked regions is formed with the uncross-linked regions of the monolayer being removed, whereby the perforation is formed. This can be achieved by one of the perforating methods (2) to (5) illustrated in the following, for example.

In the perforating method (2), perforating of the nanomembrane is performed already during the cross-linking process in step (c) of the method according to the invention.

Here, not the entire membrane is cross-linked by means of radiation, but only a specific region. In this way, a membrane with a pattern of cross-linked (i.e. previously irradiated) and uncross-linked (i.e. not previously irradiated) regions is produced. The low-molecular aromatics of the uncross-linked regions substantially do not have any bond to the cross-linked regions of the monolayer and therefore can be removed easily after the removal of the substrate. The skilled person knows corresponding methods. For example, this can be achieved by simply washing out the uncross-linked, low-molecular aromatics. The openings in the monolayer then form at the uncross-linked regions.

If the substrate is dissolved by wet-chemical etching, for example, the molecules in the uncross-linked regions are missing the fixing support. Since the molecules are not cross-linked with each other, they dissolve during etching of the substrate, and openings thus form. The dissolution of a gold substrate can be achieved by soaking it in a KCN solution. The dissolution of a SiN substrate can be achieved by HF, for example, and the dissolution of Si can be achieved by KOH, for example.

The selective etching can be performed by forming a structuring by means of finely-focused electron, ion or photon radiation, for example. In a preferred embodiment of this method, the treatment with high-energy radiation is performed using a lithographic method such that only spatially defined regions of the monolayer applied to the substrate surface are irradiated, whereby a structured surface forms on the substrate. For cross-linking with lateral structuring by means of electromagnetic radiation (e.g. X-ray radiation, UV radiation, EUV radiation), the prior art provides available light sources in conjunction with masks suitable for the respective wavelength range, or scanning by means of suitable waveguides. In a further preferred embodiment of the method according to the invention, structuring is performed by an extensively illuminating electron source in conjunction with a shadow mask, so that only the open regions are exposed to the electrons.

In a particularly preferred embodiment of the method according to the invention, cross-linking is performed by illuminating an area by means of coherent EUV radiation, wherein two or more coherent EUV beams create an interference pattern of standing waves on the surface of the monolayer, the interference pattern leading to a selective illumination and thus a structuring. This EUV interference lithography (EUV-IL) can be performed with wavelengths in the range from 600 nm to 6 nm, preferably in the range from approximately 13 nm. In this way, patterns with hole sizes in the range from approximately 1 nm to approximately 100 nm, preferably in the range of approximately 5 nm, can be produced.

In the perforating method (3), the perforation of the nanomembrane forms due to an incomplete cross-linkage, for example near defects in the molecular monolayer and/or the underlying substrate.

Here, advantage is taken of the fact that a homogeneous and defect-free membrane is obtained only if the surface of the substrate is atomically flat and homogeneous, i.e. that it does not have any edge dislocations or defects. In the perforating method (3), however, a substrate with an inhomogeneous surface structure is used. To this end, a substrate with a rough surface can be used for example. Thus, in step (b) of the method according to the invention, no homogeneous monolayer of low-molecular aromatics forms on the surface of the substrate. The subsequent irradiation in step (c) leads to a locally incomplete cross-linkage due to the inhomogeneity of the monolayer obtained in step (b). Like in the above-described perforating method (2), a perforated membrane can be obtained by removing the uncross-linked, low-molecular aromatics from the membrane.

In the perforating method (4), the perforation is obtained by a self-aggregation process on a prestructured substrate. This substrate has various regions on which the low-molecular aromatics adsorb in a different way. In a region of the substrate which is coated with a specific material, such as gold, the low-molecular aromatics, for example thiols, adsorb in an ordered way, in another region which is not coated, no adsorption of the low-molecular aromatics takes place. Likewise, substrates with regions of a differently ordered surface morphology can be used. In the atomically flat regions, ordered films form, while in the rough regions, no ordered adsorption takes place. In the subsequent irradiation in step (c) of the method according to the invention, only the ordered regions are cross-linked, while the other regions are not cross-linked. Like in the above-described perforating method (2), a perforated membrane can be obtained by removing the uncross-linked, low-molecular aromatics from the membrane.

In the perforating method (5), perforating is performed by applying a monolayer of cross-linkable, low-molecular aromatics and uncross-linkable molecules to the substrate in step (b) of the method according to the invention. This method can also be referred to as a "chemical perforation". Here, at least two groups of molecules are used. The first group is cross-linkable molecules, which later form the membrane. The other group is uncross-linkable molecules, which later form the holes. In the subsequently irradiation in step (c) of the method according to the invention, only the cross-linkable molecules are cross-linked. Like in the above-described perforating method (2), a perforated membrane can be obtained by removing the uncross-linked molecules from the membrane. Hexadecane thiol can be used as an uncross-linkable molecule, for example. In particular, e.g. a mixture of biphenyl thiol as cross-linkable aromatic (90%) and hexadecane thiol (10%) can be used in step (b) of the method according to the invention. Particularly preferable is the use of uncross-linkable molecules, which by congregating can form clusters of a defined size. In this way, it is possible to set a defined pore size in a controlled manner by a suitable selection of uncross-linked molecules.

The skilled person is capable of performing the above-described perforating methods (1) to (5) such that openings having a diameter in the range from 0.1 nm to 1 µm are obtained. In a preferred embodiment of the present invention, openings having a diameter in the range from 0.1 nm to 100 nm are obtained. In another preferred embodiment, openings having a diameter in the range from 100 nm to 1 µm are obtained. Depending on the size of the molecules to be separated and the type of separation, a suitable pore size and size of the openings, respectively, can be selected here.

The skilled person is also capable of performing the above-described perforating methods (1) to (5) such that a membrane with the desired number of openings is obtained. In a preferred embodiment, perforating is performed such that the membrane has at least 10 openings per $mm^2$ of the surface of the membrane as a perforation. If the membrane comprises less than 10 openings, a sufficient through flow is not ensured, which makes a substance separation using the membrane according to the invention difficult. In a particularly preferred embodiment, the membrane has 10 to 1000 openings per $mm^2$ of the surface of the membrane as a perforation. Further preferably, the membrane has at least 100 openings per $mm^2$ of the surface of the membrane as a perforation. If the membrane according to the invention is composed of more than one molecular monolayer, the openings in the individual monolayers form the openings and pores, respectively, of the entire membrane together.

Moreover, the present invention relates to a method for producing a membrane, in which perforating takes place in a non-directed manner. This means that a formation of pores as part of the production of the membrane occurs and that no special measures have to be taken for it. For example, in a conventional method for producing a membrane, a certain number of pores can possibly be formed, which leads to a non-directed perforation to some extent.

Thus, the present invention particularly relates to a method for producing a membrane which comprises at least one molecular monolayer composed of low-molecular aromatics and cross-linked in the lateral direction, wherein the membrane has a thickness in the range from 1 to 200 nm and a perforation in the form of openings with a diameter in the range from 0.1 nm to 1 µm, the method comprising the steps of:

(a) providing a substrate, (b) applying a monolayer of low-molecular aromatics to at least one surface of the substrate by bonding, (c) treating the substrate obtained in step (b) with high-energy radiation such that the monolayer composed of low-molecular aromatics is cross-linked in the lateral direction, and (d) removing the substrate to obtain the membrane, wherein the perforation is formed during step (c) and/or step (d).

The perforation, which in this is case is undirected, is formed during step (c) and/or step (d) in this method. Thus, perforating can take place randomly during the cross-linking of the monolayer, for example. For example, it is also possible that openings form in the membrane during the removal of the substrate in step (d).

The following explanations concerning steps (a) to (d) independently relate to the two above-illustrated methods.

The substrate provided in step (a) of the method according to the invention has at least one surface and can be composed of any suitable material. Preferably, the substrate is selected from the group consisting of gold, silver, titanium, zirconium, vanadium, chromium, manganese, tungsten, molybdenum, platinum, aluminium, iron, steel, silicon, germanium, indium phosphide, gallium arsenide, silicon nitride, and oxides or alloys or mixtures thereof, as well as indium-tin-oxide (ITO) and silicate or borate glasses. Particularly preferably, the substrate is gold-coated silicon, which further has a titanium base coating between the silicon layer and the gold layer.

Preferably, the surface of the substrate is atomically flat and homogeneous, i.e. it does not have any edge dislocations or defects. In this way, it is possible to produce a membrane that is also homogeneous and defect-free.

To subsequently temporarily covalently bond a monolayer of low-molecular aromatics to the substrate via anchor groups, the substrate surface can optionally be modified in advance. The modification can comprise a chemical modification and/or a cleaning, for example. Cleaning can be performed by a simple rinsing of the surface with water or organic solvents, such as ethanol, acetone or dimethyl formamide, or by a treatment with oxygen plasma produced by UV radiation. Particularly preferably, first of all a treatment with UV radiation is performed, followed by rinsing with ethanol and subsequent drying in a stream of nitrogen. If the monolayers with anchor groups, such as phosphonic acid, carboxylic acid or hydroxamic acid groups are to be applied to oxidized metal surfaces, an initial controlled oxidation of the metal surface is advantageous. This can be achieved by treating the metal surface with oxidizing agents, such as hydrogen peroxide, Caro's acid or nitric acid. A further possibility of modifying a substrate surface is to apply a first organic monolayer with terminal reactive groups, such as amino, hydroxy, chlorine, bromine, carboxy or isocyanate groups, to which the monolayer to be actually cross-linked is chemically coupled in a second step by means of suitable functional groups.

Subsequently, in step (b) of the method according to the invention, a monolayer of low-molecular aromatics is applied to at least one surface of the substrate by bonding. This bond can be achieved by adsorption or by bonding via anchor groups. Preferably, the monolayer is applied to the surface of the substrate by a covalent bond via anchor groups. The monolayer can be applied e.g. by dipping, pouring, spinning methods, or by adsorption from solution. Such methods are known in the prior art. Preferably, a monolayer of aromatics selected from the group consisting of phenyl, biphenyl, terphenyl, naphthaline, anthracene, bipyridine, terpyridine, thiophene, bithienyl, terthienyl, pyrrole, and combinations thereof is applied. In a particularly preferred embodiment of the present invention, the aromatics is biphenyl, which is covalently bonded to the substrate via a thiol group.

In step (c) of the method according to the invention, the substrate obtained in step (b) is treated with high-energy radiation such that the monolayer composed of low-molecular aromatics is cross-linked in the lateral direction. Preferably, the monolayer is cross-linked covalently in the lateral direction. Preferably, the treatment is performed with electron radiation, plasma radiation, X-ray radiation, β-radiation, γ-radiation, UV radiation or EUV radiation.

In a preferred embodiment of the method according to the invention, an extensively illuminating electron source, e.g. a flood gun, or a construction as described in FIG. 2 of Hild et al., *Langmuir* 1998, 14, 342-346, can be used for irradiation with electrons. Here, the electron energy used can be adapted to the respective organic films and their substrates in a broad range, preferably 1 to 1000 eV. For example, for cross-linking biphenyl-4-thiol to gold, electron radiation with 50 eV can be used.

For extensive cross-linking by means of electromagnetic radiation (e.g. X-ray radiation, UV radiation, EUV radiation), light sources available in the prior art can be used.

If, for example, in step (b), saturated molecules and units, respectively, such as cyclohexyl, bicyclohexyl, tercyclohexyl, partially or fully hydrogenated naphthalines or anthracenes, or partially or fully hydrogenated heteroaromatics are applied and covalently bonded to the substrate surface by means of an anchor group, instead of a monolayer of low-molecular aromatics, dehydrogenation to the respective aromatics and heteroaromatics, respectively, can take place in addition to the cross-linking in the lateral direction by means of the high-energy radiation treatment in step (c).

In step (d) of the method according to the invention, the substrate is removed afterward to obtain the membrane. For example, this can be achieved by dissolving the substrate by etching, or by chemically breaking the bond between the monolayer and the substrate via the anchor group. Corresponding methods for removing the substrate from the monolayer are known in the prior art. If a thiol group is used as an anchor group, this can be achieved by a treatment with iodine, for example (cf. e.g. W. Eck et al., *Adv. Mater.* 2005, 17, 2583-2587). After the substrate has been removed, the molecular monolayer is in the form of a membrane.

In a preferred embodiment of the method according to the invention, at least partially low-molecular aromatics having at least one functional group are used, whereby a membrane is obtained in which one of the two surfaces of the molecular monolayer is modified by functional groups.

For the purposes of the present invention, the term "aromatics having at least one functional group" means such aromatics that have at least one functional group. The functional group can be any functional group that is not split off by the subsequent irradiation and that is suitable for a further reaction, for example to bond further molecules to the monolayer. Preferably, the functional groups are selected from amino groups, nitro groups, carboxy groups, cyano groups, thiol groups, hydroxy groups, and combinations thereof. The nitro group is a particularly preferred functional group. In the case of a nitro group, by the irradiation of the substrate with high-energy radiation in step (c), a conversion of the nitro groups to amino groups takes place in addition to cross-linking. It is assumed that this reduction is preceded by a C—H bond cleavage in the aromatics and that the released hydrogen atoms reduce the nitro groups to amino groups afterward.

In a further particularly preferred embodiment, the functional groups are special ligands suitable for bonding specific target molecules. These ligands can be bonded to the molecular monolayer by modification of the above-mentioned amino groups, nitro groups, carboxy groups, cyano groups, thiol groups, or hydroxy groups. This modification is preferably performed after the cross-linking of the monolayer and the perforation took place. Examples of such ligands are ion exchangers, chelating agents, amino acids, coenzymes, cofactors and their analogues, endocrine and exocrine substances, such as hormones, enzyme substrates, enzyme inhibitors, nucleic acids, such as DNA and RNA, viruses, and polypeptides, such as proteins, in particular antibodies and enzymes. The skilled person knows suitable methods for bonding such ligands.

In a further preferred embodiment of the present invention, the low-molecular aromatics have the functional group in a terminal position such that the functional groups are on the surface of the monolayer after formation thereof.

In this way, it is possible to produce a membrane in which one of the two surfaces of the molecular monolayer is modified by functional groups. As explained above, this is particularly advantageous, if the membrane is to be used as an adsorption membrane for separating specific substances.

In a further preferred embodiment of the present invention, at least two perforated, molecular monolayers are arranged one on top of the other to form a stack. Preferably, 2 to 100 monolayers are arranged one on top of the other, particularly preferably 2 to 50, even more preferably 2 to 10 monolayers are arranged one on top of the other. In this way, a membrane having a thickness in the range from 1 to 200 nm can be obtained.

In a further preferred embodiment, the method according to the invention further comprises the final step of applying an additional coating to the membrane. The coating can be a metal coating, for example. Preferably, the coating is a gold coating. The coating can have any suitable thickness. Preferably though, the coating has a thickness in the range from 1 nm to 10 nm, particularly preferably in the range from 2 nm to 5 nm. The coating can be applied by methods known in the art, for example by vapor deposition.

The membrane according to the invention is mechanically more stable than conventional membranes. In addition, the mechanical strength, the electrical conductivity, and the permeability of the nanomembrane according to the invention can be adjusted within a broad range. This can be achieved by a modification with functional groups, the selection of number and size of the openings, and by a variation of the thickness of the membrane by stacking of individual monolayers, or by a variation of the molecule lengths of the aromatics forming the molecular monolayer.

The present invention further relates to the use of the membrane according to the invention as a membrane filter or an adsorption membrane for separating mixtures of substances. A use for the filtration or separation of gases and liquids is particularly preferred. A use in food, drinking water, or waste water analytics, for the purification of drinking water or waste water, in the medical field, for example in the field of dialysis, in batteries or in fuel cells.

In another preferred embodiment of the present invention, the membrane according to the invention is used in sensor technology. In a further preferred embodiment of the present invention, the membrane obtainable by the method according to the invention is used in sensor technology.

The present invention will be further explained by the following, non-limiting example.

EXAMPLE 1

First of all, a nitrobiphenyl thiol monolayer was cross-linked by means of EUV-IL. Here, circular openings having diameters in the range from 300 nm to 30 nm are formed, wherein the distances between the individual openings were 300 nm to 100 nm. The sizes and positions of the openings were determined by means of transmission electron microscopy. Subsequently, the obtained nanomembranes were coated with a gold film having a thickness in the range from 2 nm to 5 nm.

We claim:

1. A membrane, which comprises at least one molecular monolayer composed of low-molecular aromatics and cross-linked in the lateral direction, wherein the membrane has a thickness in the range from 1 to 200 nm and a perforation in the form of openings having a diameter in the range from 0.1 nm to 1 µm, wherein the membrane has at least $10^8$ openings per $mm^2$ of the surface of the membrane as a perforation.

2. The membrane according to claim 1, which is composed of a stack of at least two molecular monolayers arranged one on top of the other.

3. The membrane according to claim 1, wherein one of the two surfaces of at least one molecular monolayer is modified by functional groups.

4. The membrane according to claim 3, wherein one of the two surfaces of at least one molecular monolayer is modified by amino groups as functional groups.

5. The membrane according to claim 1, wherein the molecular monolayer is composed of aromatics selected from the group consisting of phenyl, biphenyl, terphenyl, naphthaline, anthracene, bipyridine, terpyridine, thiophene, bithienyl, terthienyl, pyrrole, and combinations thereof.

6. A method for purifying or separating mixtures comprising separating mixtures of substances using the membrane of claim 1.

7. A sensor comprising the membrane of claim 1.

8. A method for producing a membrane which comprises at least one molecular monolayer composed of low-molecular aromatics and cross-linked in the lateral direction, wherein the membrane has a thickness in the range from 1 to 200 nm and a perforation in the form of openings with a diameter in the range from 0.1 nm to 1 µm, the method comprising the steps of
(a) providing a substrate,
(b) applying a monolayer of low-molecular aromatics to at least one surface of the substrate by bonding,
(c) treating the substrate with the monolayer obtained in step (b) with high-energy radiation such that the monolayer composed of low-molecular aromatics is cross-linked in the lateral direction, and
(d) removing the substrate to obtain the membrane,
wherein the method further comprises; during or after at least one of the above-mentioned steps (c) and (d), the step of:
(e) perforating the membrane, which is performed such that openings having a diameter in the range from 0.1 nm to 1 µm are produced, wherein the membrane has at least $10^8$ openings per $mm^2$ of the surface of the membrane as a perforation.

9. The method according to claim 8, wherein perforating takes place in that the cross-linking in step (c) is performed in an incomplete way such that a monolayer with cross-linked and uncross-linked regions is formed, wherein the uncross-linked regions of the monolayer are removed, whereby the perforation is formed.

10. The method according to claim 9, wherein cross-linking is performed by illuminating an area by means of coherent EUV radiation, wherein two or more coherent EUV beams create an interference pattern of standing waves on the surface of the monolayer, the interference pattern leading to a selective illumination and thus a structuring.

11. The method according to claim 8, wherein the perforation is formed during step (c), during steps (c) and (d), or during step (d).

12. The method according to claim 11, wherein the irradiation in step (c) is performed with electron radiation, plasma radiation, X-ray radiation, β-radiation, γ-radiation, UV radiation or EUV radiation.

13. The method according to claim 8, wherein the application in step (b) is performed by dipping, pouring, spinning methods, or by adsorption from solution.

14. The method according to claim 8, wherein the aromatic is biphenyl, which is covalently bonded to the substrate via a thiol group as an anchor group.

15. The method according to claim 8, wherein at least partially low-molecular aromatics having at least one functional group are used, whereby a membrane is obtained in which one of the two surfaces of the molecular monolayer is modified by functional groups.

16. The method according to claim 8, wherein at least two perforated, molecular monolayers are arranged one on top of the other to form a stack.

17. A method for purifying or separating mixtures comprising separating mixtures of substances using a membrane prepared by the method of claim 8.

18. A sensor comprising the membrane prepared by the method of claim 8.

19. A method for producing a membrane which comprises at least one molecular monolayer composed of low-molecular aromatics and cross-linked in the lateral direction, wherein the membrane has a thickness in the range from 1 to 200 nm and a perforation in the form of openings with a diameter in the range from 0.1 nm to 1 μm the method comprising the steps of:
- (a) providing a substrate,
- (b) applying a monolayer of low-molecular aromatics to at least one surface of the substrate by bonding,
- (c) treating the substrate with the monolayer obtained in step (b) with high-energy radiation such that the monolayer composed of low-molecular aromatics is cross-linked in the lateral direction, and
- (d) removing the substrate to obtain the membrane, wherein the method further comprises, between steps (c) and (d) or after step (d), the step of:
- (e) perforating the membrane by irradiation with particle radiation selected from the group consisting of electron radiation and ion radiation, which is performed such that openings having a diameter in the range from 0.1 nm to 1 μm are produced.

20. The method according to claim 19, wherein the application in step (b) is performed by dipping, pouring, spinning methods, or by adsorption from solution.

21. The method according to claim 19, wherein the aromatic is biphenyl, which is covalently bonded to the substrate via a thiol group as an anchor group.

22. The method according to claim 19, wherein at least partially low-molecular aromatics having at least one functional group are used, whereby a membrane is obtained in which one of the two surfaces of the molecular monolayer is modified by functional groups.

23. The method according to claim 19, wherein at least two perforated, molecular monolayers are arranged one on top of the other to form a stack.

24. The method according to claim 8, wherein the substrate has an inhomogeneous surface.

* * * * *